A. T. ELLIOTT.
PROCESS FOR CHEMICAL SEPARATION OF ORES.
APPLICATION FILED FEB. 20, 1918.

1,327,536.

Patented Jan. 6, 1920.

INVENTOR
Alexander T. Elliott
BY
Arthur P. Knight
ATTORNEY

UNITED STATES PATENT OFFICE.

ALEXANDER T. ELLIOTT, OF LOS ANGELES, CALIFORNIA, ASSIGNOR OF ONE-TENTH TO L. M. FREEMAN, OF LOS ANGELES, CALIFORNIA.

PROCESS FOR CHEMICAL SEPARATION OF ORES.

1,327,536.  Specification of Letters Patent.  Patented Jan. 6, 1920.

Application filed February 20, 1918. Serial No. 218,210.

*To all whom it may concern:*

Be it known that I, ALEXANDER T. ELLIOTT, a citizen of the United States, residing at Los Angeles, in the county of Los Angeles and State of California, have invented a new and useful Process for Chemical Separation of Ores, of which the following is a specification.

The object of this invention is to concentrate low grade ores by a chemical method of separation. There are many deposits of ore so low in the amount of the valuable constituents that it is impossible to use them for a commercial purpose. These ores are frequently of such a character that no mechanical separation can be made between the valuable constituents and the useless gangue, and it is the purpose of this invention to produce effective separation of the valuable and useless constituents of the ore by chemical means. My invention may be carried out in some cases by dissolving the valuable elements and by filtration separating the useless material from the solution, and by treating the solution by some chemical means, precipitate or otherwise recover the valuable element or compound in a marketable form.

In other cases it is preferable to dissolve the impurities and thus, after filtration, separate the valuable elements or compounds.

In order to make a process of this kind commercially practicable, it is necessary to provide for regeneration of the leaching agent in an economical and efficient manner. This I accomplish by subjecting the product or products of the leaching and precipitating operations, to the action of heat, (with or without other reagents) in such manner as to recover the leaching agent.

My process consists essentially in leaching the ore with hydrochloric acid solution, separating the resulting solution from the residue, so as to obtain the cleaned valuable product either in the residue or in the solution as the case may be, and then subjecting a constitutent of such solution to the action of heat (with a suitable reagent if necessary) to reproduce the original leaching agent.

The accompanying drawings illustrate apparatus suitable for carrying out my invention, and referring thereto:

Figure 1:
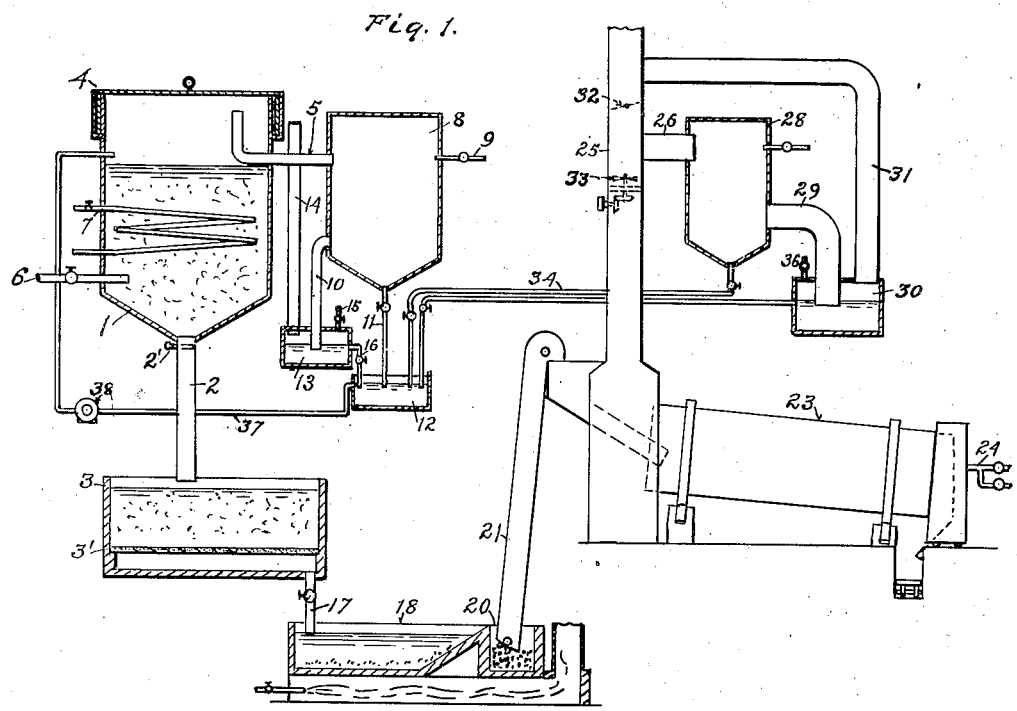
Figure 1 is a diagrammatic section of such an apparatus partly in elevation.

In Fig. 1, 1 indicates a leaching tank adapted to receive the material to be heated, and having a discharge pipe 2 provided with gate 2' for conducting the sludge to a filter means 3. Tank 1 may have a removable cover 4 to facilitate introduction of the charge thereinto, and is provided with an outlet pipe 5 for gaseous products of reaction, with an air inlet pipe 6 for supplying air for agitation and with a heating means in the form of a steam coil 7. Pipe 5 leads to a chamber or burner 8 provided with a steam supply pipe 9, and with outlet pipes 10 and 11 for gaseous and liquid products respectively, pipe 11 leading to a sump 12 and pipe 10 leading to a trap 13 containing water for absorbing constituents of the gases passing from chamber 8. The residual gas may be discharged through stack 14 and the trap 13 may be provided with water supply means 15 and with an outlet 16 leading to sump 12.

Filter means 3 may be of any suitable construction, either a filter tank with permeable fixed filter means 3' as shown or a continuous filter of any well known type. The filtrate discharge pipe 17 of said filter leads to an evaporating tank 18. Suitable means such as receptacle 20 may be provided for receiving the crystals, precipitate or evaporated residue from tank 18, and means such as elevator 21 for conveying such material to a retort 23. Said retort may be of any suitable construction, for example a rotary kiln, adapted for continuous operation, fired by means 24 and discharging vaporized material with a stack 25, or it may be a closed retort adapted for batch operation. Stack 25 is connected by flue 26 to a reaction chamber or tower 28, from which a pipe 29 leads to a trap 30, having a discharge pipe 31, a valve 32 and blower 33 being provided in stack 25 to force the gases through this trap. Condensed liquid from chamber 28 runs through pipe 34 to sump 12 which may also receive the liquid from trap 30, the latter being supplied with water through pipe 36. The liquid collecting in sump 12 contains the regenerated leaching agent and may be returned to leaching chamber 1 by pipe connection 37 and pump 38.

To illustrate one important application of this process, low grade manganese ores may be taken. Many low grade deposits are of such a nature, on account of the presence of silica and other useless compounds as to make them entirely unfit for industrial application. The operation of this process in this case is to dissolve the manganese oxid by the use of hydrochloric acid in tank 1, filtering the solution from the inert matter in filter 3, evaporating the solution to the crystallizing point in tank, and separating the crystals of manganese chlorid from the mother liquor, then drying the crystals of chlorid if necessary and heating them in kiln or in a closed retort 23 to a sufficient temperature to drive off the chlorin or hydrochloric acid. The mixture of hydrochloric acid and chlorin, which will be given off in retort 23 is collected in a condensing apparatus and treated with steam, for example in chamber 28, or by any other suitable means to convert the chlorin into hydrochloric acid. The result in this case is that I recover the hydrochloric acid used and it is utilized to leach another charge. When the hydrochloric acid is applied to the crude ore, chlorin is given off; this chlorin is changed into hydrochloric acid by any suitable means, for example by steam supplied through pipe 9. Thus, I recover all the chemicals used in the leaching operation and the only loss entailed in the operation is a small mechanical one incidental to the working of the process.

Should there be lime present, this can be eliminated by the application of sulfur fumes which will change the lime into calcium sulfite and by the action of hot air in the solution, the sulfite may be changed into sulfate and rendered insoluble and can be separated in the usual manner. We thus obtain as a last result the manganese as an oxid, or a mixture of oxids.

Another example of my invention is the purifying of aluminum ores from the silica and lime which they frequently contain. These ores are usually more difficult to be acted upon by an acid which may be employed, but with proper care in regard to temperature and agitation the aluminum oxid may be completely dissolved. This result will be found to take place in many ores. Filtration is now resorted to in order to separate the solution containing the aluminum, and if we have used hydrochloric acid, it will be in the form of aluminum chlorid. The process of evaporating the solution to the crystallizing point is carried out as before and I thus obtain aluminum chlorid.

Figure 2:
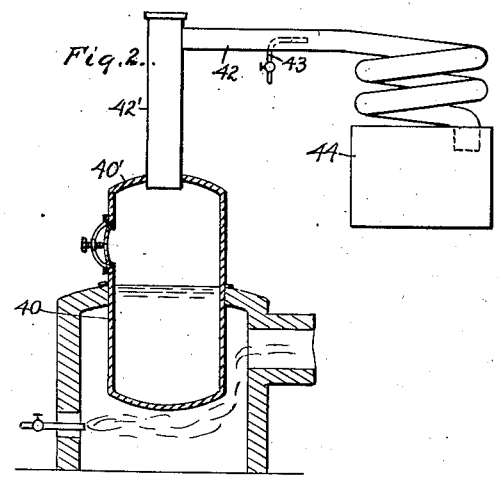
Fig. 2 is a vertical section of a furnace and condenser adapted for use in my invention.

This chlorid, after being dried is placed in a retort used for example as shown at 40 in Fig. 2 with a condensing means attached and is heated to the decomposing point. As aluminum chlorid has a tendency to volatilize at this temperature, some of it may be distilled over, while part will be decomposed. The upper part 40' of the retort or the first part of the condensing tube 42 near the retort should be cooled (for example by exposure to the air) so as to prevent the volatilization or the carrying over of the chlorid in the form of vapor and the apparatus arranged so that the condensed chlorid will be returned to the retort while the vapor will pass on to the receiver 44.

The first part of the distillate will consist of hydrochloric acid formed by the chlorin of the chlorid and the water of crystallization accompanying it. Toward the latter end of the operation, after the water has been all expelled the product will be chlorin and this chlorin is mixed with steam supplied by pipe 43 in the condensing apparatus which changes it into hydrochloric acid. We thus recover in this case the chemicals used for the leaching, less a small mechanical loss.

Should lime occur in this ore, it can be treated with sulfur fumes to precipitate it as calcium sulfate as in the former case. Other acids may be used to carry out this process in so far as they form compounds with the ores used that are decomposable at any available temperature.

The sulfur fumes used for the precipitation of the lime in any given case would, of course, be lost and would require to be charged up to the cost of the process because no recovery would be possible under the conditions described.

Another example of the application of this process is in the treatment of low grade magnesite ores containing silica, or other insoluble matters. When this ore is treated with hydrochloric acid, the magnesium carbonate dissolves, leaving the insoluble matter to be filtered off. The solution of magnesium chlorid can be crystallized and the crystals heated in a retort and the acid fumes recovered to be used in a further charge.

It is not meant to confine the process to these examples given, but it may be used in any case where the principles described may be used. It is not meant either to confine the process to the use of hydrochloric acid, though this acid will be found very convenient in many cases.

My invention is also applicable to the concentration of copper, zinc and other metallic ores.

As another example of my process, certain ores of copper, such as sulfids or silicates, may be purified or separated from substances, such as iron, alumina and lime, which would interfere with ordinary leaching processes, by first treating such ore with cold dilute hydrochloric acid, to dissolve such impurities, leaving the ore values in the residue, and then regenerating the acid by heat treatment of the salts obtained from the resulting solution, so as to recover the acid for cyclic operation.

What I claim is:

1. The process of separation of ores, which consists in leaching the ore with hydrochloric acid, separating the resulting chlorid solution from the residue, treating said solution to obtain a chlorid, subjecting said chlorid to heat to decompose said chlorid and to drive off a vapor containing chlorin and utilizing such chlorin in reproducing the leaching solution.

2. The process according to claim 1, wherein water is maintained in presence of the chlorin produced from the chlorid by heat to produce hydrochloric acid.

In testimony whereof I have hereunto subscribed my name this 14th day of February, 1918.

ALEXANDER T. ELLIOTT.